(12) United States Patent
Fukawa et al.

(10) Patent No.: US 7,153,007 B2
(45) Date of Patent: Dec. 26, 2006

(54) VEHICLE LIGHTING APPARATUS

(75) Inventors: Kiyotaka Fukawa, Shizuoka (JP); Masahito Naganawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 162 days.

(21) Appl. No.: 10/888,909

(22) Filed: Jul. 9, 2004

(65) Prior Publication Data
US 2005/0018438 A1   Jan. 27, 2005

(30) Foreign Application Priority Data
Jul. 10, 2003   (JP)   .......................... P. 2003-272724

(51) Int. Cl.
*B60Q 1/12* (2006.01)
*B60Q 1/06* (2006.01)
(52) U.S. Cl. .......................................... 362/465; 362/43
(58) Field of Classification Search ................. 362/37, 362/40, 41, 43, 464, 465, 466; 315/81, 82
See application file for complete search history.

(56) References Cited
U.S. PATENT DOCUMENTS
4,733,333 A  *  3/1988  Shibata et al. .................. 362/40

2004/0210369 A1 * 10/2004 Mizuno et al. ............. 362/466

FOREIGN PATENT DOCUMENTS
JP  62-244735   10/1987
JP  2002-160581   6/2002

* cited by examiner

*Primary Examiner*—Y. My Quach-Lee
(74) *Attorney, Agent, or Firm*—Fish & Richardson P.C.

(57) ABSTRACT

The deflection angles of the irradiation of lamps provided at the left and right portions of an automobile are continuously increased in correspondence to the increase of a steering angle until the steering angle reaches a predetermined value. The left and right lamps are held at particular deflection angles respectively when the steering angle is equal to or more than a predetermined steering angle. The value of the particular deflection angle of the lamp on the steering direction side is made larger than that of the lamp on the opposite side. When the deflection angle is small, the left and right lamps are deflected in almost the same state to irradiate the straight traveling direction or the traveling direction of an automobile. When the deflection angle becomes large, the lamp on the steering direction side irradiates the traveling direction and the lamp on the opposite direction irradiates an area in the straight traveling direction.

6 Claims, 10 Drawing Sheets

VEHICLE LIGHTING APPARATUS

TECHNICAL FIELD

The present disclosure relates to a lighting apparatus for a vehicle which can be applied to a headlight apparatus of a vehicle such as an automobile and, in particular, relates to a vehicle lighting apparatus which can be provided with a light distribution control means, for example, an adaptive front-lighting system (hereinafter referred to as AFS) for changing the illumination direction and area of a lamp in accordance with a traveling state.

BACKGROUND

As the AFS proposed in order to improve the traveling safety of an automobile, there is a technique described in a Japanese patent document, JP-A-2002-160581. As shown in the schematic diagram of FIG. 1, an automobile CAR is provided with a steering sensor 1A for detecting a steering angle of a steering apparatus and a vehicle speed sensor 1B for detecting a vehicle speed. The detection outputs of these sensors 1A, 1B are inputted into an electronic control unit (hereinafter referred to as ECU) 2. The ECU 2 controls the irradiation area, e.g., the irradiation direction of head lamps (or headlights) 3 (swivel type lamps 3R, 3L) provided at the right and left front portions of an automobile so as to deflect in the left and right directions based on the detection outputs thus inputted thereby to change the light distribution characteristics. According to the AFS, when an automobile travels on a curved road, it is possible to deflect the irradiation direction of the swivel type lamps in accordance with the steering angle of the automobile to illuminate the portion of the road ahead of the curve, thereby being effective in improving traveling safety.

Figure 1:
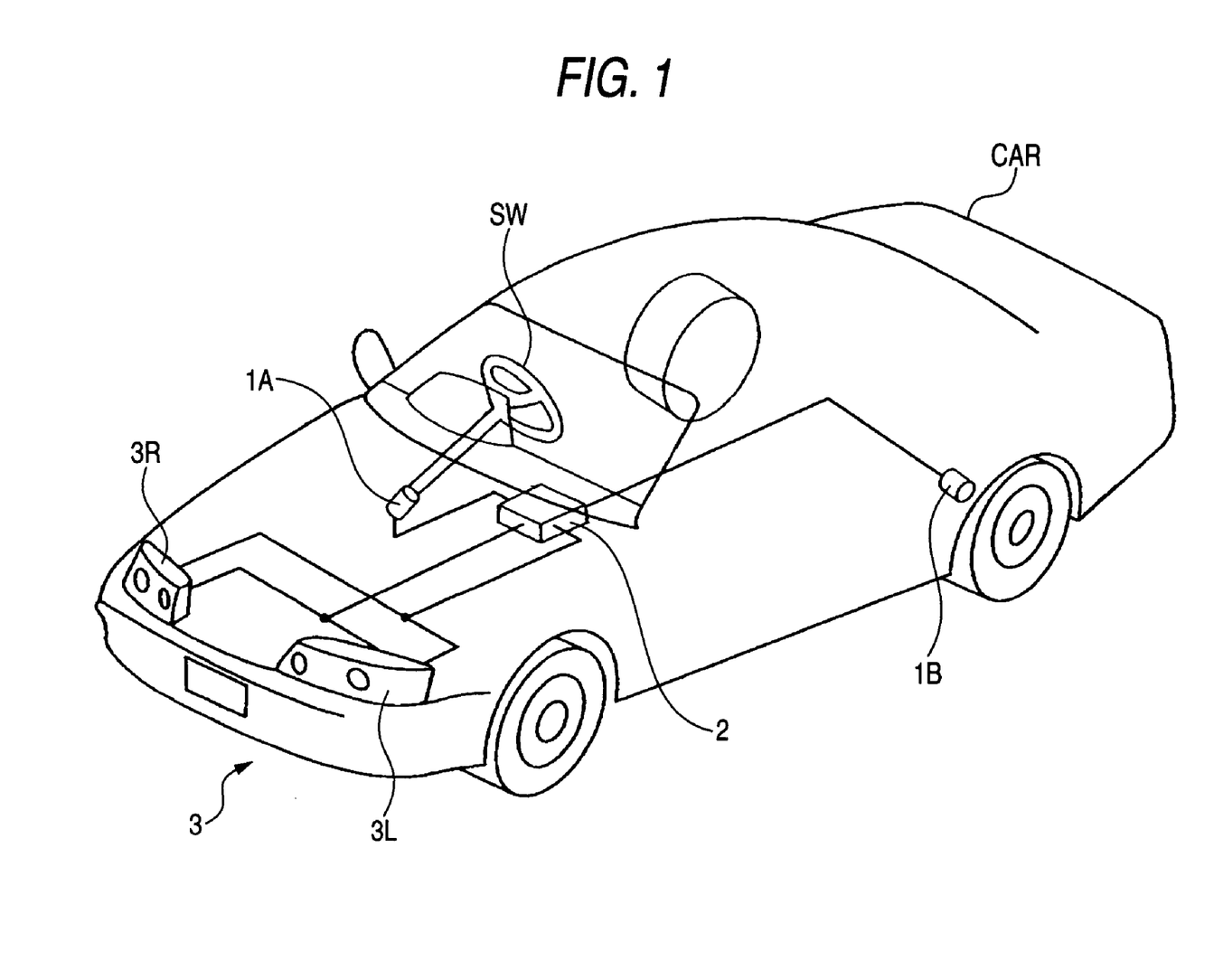
FIG. 1 is a diagram showing the schematic configuration of an AFS.

In such an AFS, when the left 3L and right 3R swivel type lamps are controlled so as to deflect merely in accordance with the steering angle, there arise various kinds of inconveniences. Various trials have been performed in order to eliminate such inconveniences. For example, a Japanese patent document, JP-A-62-244735, proposes a technique in which the timings of the deflection operations of left and right swivel type lamps with respect to the steering angle are differentiated in order to secure irradiation areas in the steering direction and the direction opposite thereto at the time of steering to the left or right, thereby to improve the visibility in a wide area. In this case, for example, at the time of steering to the right, the right swivel type lamp is deflected prior to the deflection of the left swivel type lamp. Then, when the steering angle reaches a certain angle, the left swivel type lamp is deflected to the right.

As described above, in the technique disclosed in JP-A-62-244735, since the timing of the deflection operation is differentiated between the left and right swivel type lamps, it is advantageous that the irradiation range of the lamps is enlarged. However, according to this technique, when the steering angle exceeds a predetermined angle, the deflection angles of the left and right swivel type lamps become equal to each other and so the lamps are directed to the same direction. Accordingly, when both the left and right swivel type lamps are deflected, an area in the straight traveling direction of an automobile is not irradiated sufficiently, so that it is difficult to confirm the safety in the straight traveling direction and so not preferable from the view point of traffic safety. Further, according to JP-A-62-244735, the deflection angle of the left and right swivel type lamps are changed according to the stepwise characteristics in correspondence to the change of the steering angle. Thus, there likely arises a condition when the deflection angle is unstable around the steering angle near the boundary of the step portion, so that the irradiation range vibrates to the left and right thereby to make a driver feel worrisome.

Accordingly, an advantage of the invention is that it provides a vehicle lighting apparatus which can suitably irradiate the steering direction at the time of steering to the right or left and also can suitably irradiate the straight traveling direction of an automobile.

SUMMARY

The invention is arranged in a manner that in a vehicle lighting apparatus in which the irradiation direction of lamps provided at the left and right portions of an automobile can be deflected to the left and right directions in association with the steering operation of a steering apparatus, wherein the deflection angles of the left and right lamps are continuously increased corresponding to the increase of the steering angle until the steering angle reaches a predetermined value, the left and right lamps are held at particular deflection angles respectively when the steering angle is equal to or more than a predetermined steering angle, and the value of the particular deflection angle of the lamp on a steering direction side is made larger than that of the lamp on a side opposite to the steering direction side.

According to an aspect of the invention, the deflection angles of the irradiation of lamps provided at the left and right portions of an automobile are continuously increased in correspondence to the increase of a steering angle until the steering angle reaches a predetermined value. The left and right lamps are held at particular deflection angles respectively when the steering angle is equal to or more than a predetermined steering angle. The value of the particular deflection angle of the lamp on the steering direction side is made larger than that of the lamp on the opposite side. Thus, when the deflection angle is small, the left and right lamps are deflected in almost the same state to irradiate the straight traveling direction or the traveling direction of an automobile. When the deflection angle becomes large, the lamp on the steering direction side irradiates the traveling direction and the lamp on the opposite direction irradiates an area in the straight traveling direction. Accordingly, the irradiation area can be changed in accordance with the steering angle. Further, an area in the straight traveling direction as well as the steering direction can be suitably illuminated at the time of steering an automobile to the left and right, and so the stable traveling according to the AFS can be realized.

According to an aspect of the invention, a ratio of the particular deflection angle of the lamp on the steering direction side with respect to the particular deflection angle of the lamp on the side opposite to the steering direction side is set preferably in a range of 1.5 to 2.5. Further, the deflection angles of the left and right lamps are changed with the same rate of change with respect to the steering angle until the steering angle reaches the predetermined steering angles, and the predetermined steering angle of the lamp on the steering direction side differs from the predetermined steering angle of the lamp on the side opposite to the steering direction side. Alternatively, the rate of change of the deflection angle of the lamp on the steering direction side with respect to the steering angle is made larger than the rate of change of the deflection angle of the lamp on the side opposite to the steering direction side with respect to the steering angle until the steering angle reaches the predetermined steering angle. In this case, the predetermined steering angle of the lamp on the steering direction side may be same as the predetermined steering angle of the lamp on the side opposite to the steering direction side.

DETAILED DESCRIPTION

Figure 2:
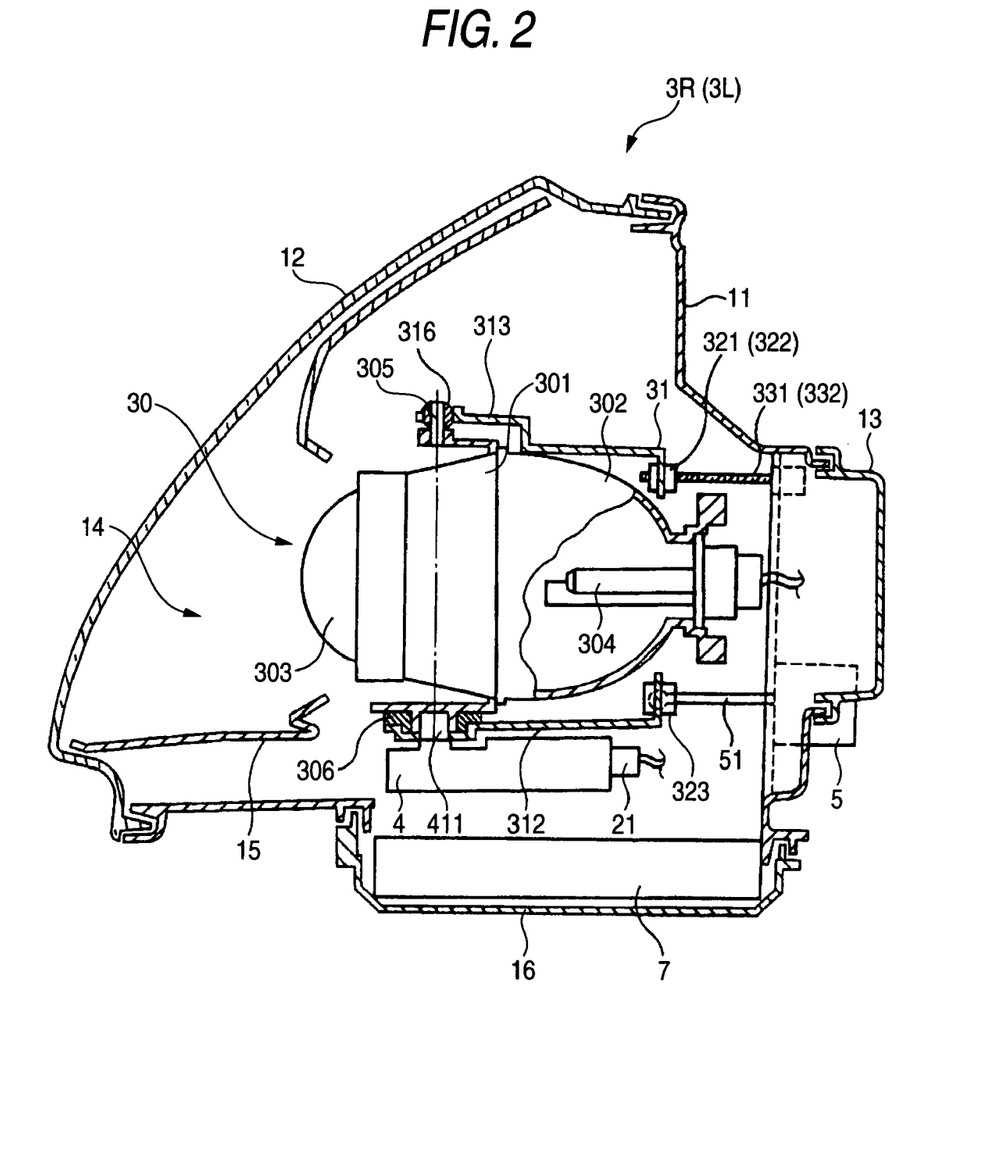
FIG. 2 is a vertical sectional diagram of a swivel type lamp.
Figure 3:
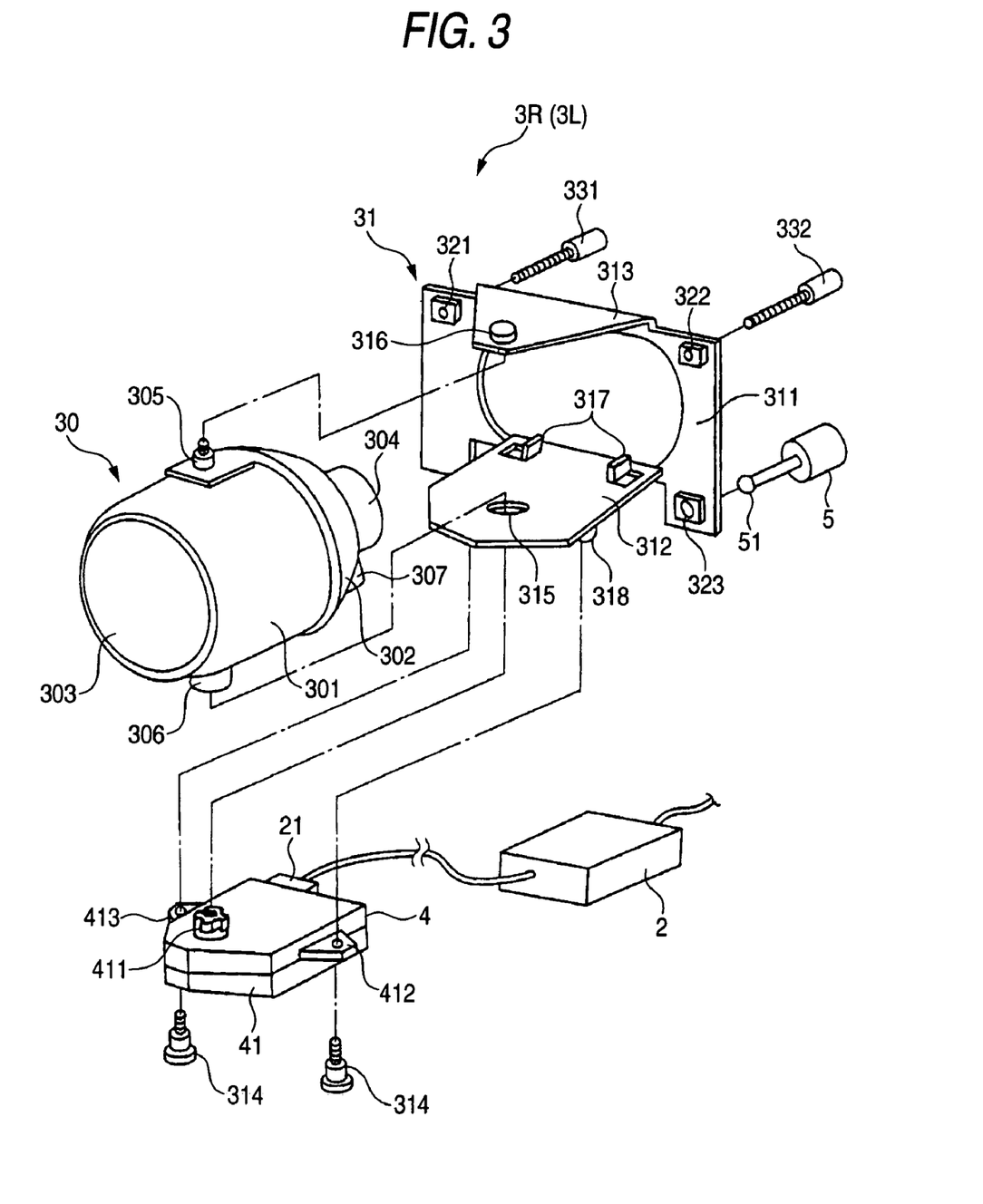
FIG. 3 is an exploded perspective view showing the main portion of the inner structure of the swivel type lamp.

Next, an embodiment of the invention will be explained with reference to the accompanying drawings. FIG. 2 is a vertical sectional diagram of the inner structure of a swivel type lamp, having the elements of the AFS explained above with reference to FIG. 1, which is capable of deflecting the irradiation direction to the left and right. FIG. 3 is a partially exploded perspective view of the main portion of the swivel type lamp. A lamp body 11 is provided with a lens 12 at the front opening thereof and a rear cover 13 at the rear opening thereof to form a lamp chamber 14. A projector lamp 30 is disposed within the lamp chamber 14. The projector lamp 30 is integrally formed by a sleeve 301, a reflector 302, a lens 303 and a light source 304. Although a detailed description of the projector lamp is not provided since the projector lamps are well known, the projector lamp using a discharge valve as the light source 304 is employed in this embodiment. The projector lamp 30 is supported by a bracket 31 configured in an almost U-shape. An extension 15 is disposed around the projector lamp 30 within the lamp body 11 so that the inner portion of the swivel type lamp is not exposed through the lens 12. Further, in this embodiment, a lighting circuit 7 for turning on the discharge valve of the projector lamp 30 is provided within the swivel type lamp by using a lower cover 16 attached to the bottom opening of the lamp body 11.

The projector lamp 30 is supported in a state of being sandwiched between a lower plate 312 and an upper plate 313 each of which is bent almost perpendicularly from the vertical plate 311 of the bracket 31. An actuator 4 described later is fixed on the lower side of the lower plate 312 by means of screws 314. The rotation output shaft 411 of the actuator 4 protrudes from the upper side through a shaft hole 315 perforated at the lower plate 312. Each of the screws 314 is fastened by a boss 318 protrusively provided on the lower surface of the lower plate 312. A shaft portion 305 provided at the upper surface of the projector lamp 30 is fit into and coupled to a bearing 316 provided at the upper plate 313, and a coupling portion 306 provided at the lower surface of the projector lamp 30 is fit into the rotation output shaft 411 of the actuator 4, whereby the projector lamp 30 is made rotatable in the right and left direction with respect to the bracket 31. Further, as described later, the projector lamp can be rotated in the horizontal direction integrally with the rotation output shaft 411 in accordance with the operation of the actuator 4.

The bracket 31 is integrally attached with aiming nuts 321, 322 at the left and right portions of the upper portion thereof when seen from the front side, respectively, and further integrally attached with a leveling bearing 323 at the lower portion on the right side thereof. The aiming nuts are screwed and engaged with a horizontal aiming screw 331 and a vertical aiming screw 332 rotatably supported by the lamp body 11 and the leveling pole 51 of the leveling mechanism 5 is fit into the leveling bearing. The bracket 31 can be rotated in the horizontal direction and the vertical direction by rotating the horizontal aiming screw 331 and vertical aiming screw 332 with respect to their shafts. Further, the bracket 31 can be rotated in the vertical direction by moving the leveling pole 51 forward and backward along the axial direction thereof by means of the leveling mechanism 5. Thus, it becomes possible to perform the aiming adjustment for adjusting the optical axis of the projector lamp 30 in the left and right directions and the vertical direction and also to perform the leveling adjustment for adjusting the optical axis of the projector lamp in the vertical direction in accordance with the leveling state caused by the change of the vehicle height. A projection 307 is protrusively provided at the lower surface of the reflector 302 of the projector lamp 30. A pair of stoppers 317 are formed at the left and right positions of the lower plate 312 of the bracket 31 opposing to the projection in a manner of being cut and bent upward from the lower plate. The projection 307 bumps against one of the stoppers 317 in accordance with the rotation of the projector lamp 30, whereby the rotation range of the projector lamp 30 is restricted.

The actuator 4 includes a case 41 having a shape similar to a pentagonal shape. The case 41 is provided with supporting pieces 412, 413 so as to protrude outside at both the side surfaces thereof, respectively. These supporting pieces are used in order to affix the case 41 to the bosses 318 of the bracket 31 by means of the screws 314. The rotation output shaft 411 configured in a spline configuration protrudes from the upper surface of the case 41 and is coupled to the coupling portion 306 of the bottom surface of the projector lamp 30. The rotation output shaft 411 is rotated reciprocally within a predetermined rotation angle by a motor 42 described later which is housed within the actuator 4. A connector (not shown) is disposed on the rear surface of the case 41 so that an external connector 21 coupled to the ECU 2 is fit into this unshown connector.

Figure 4:
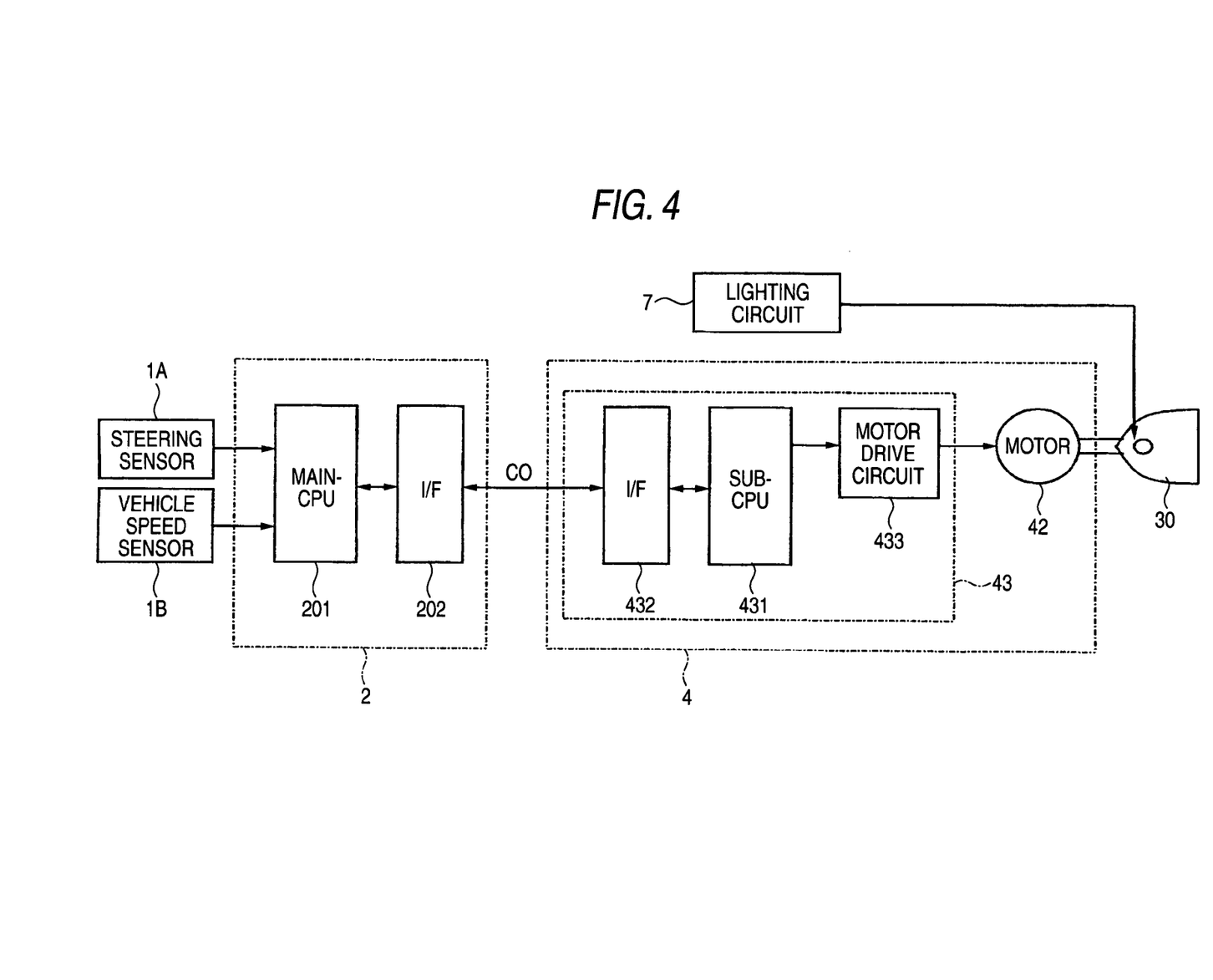
FIG. 4 is a block circuit diagram showing the circuit configuration of the AFS.

FIG. 4 is a block diagram showing the electric circuit configuration of the lighting apparatus including the ECU 2 and the actuator 4. The actuator 4 is provided at each of the right and left swivel type lamps 3R, 3L of the automobile and can communicate with the ECU 2 bidirectionally. The ECU 2 includes therein a main CPU 201 serving as a main control circuit which performs processing of a predetermined algorithm based on a steering angle and a vehicle speed respectively detected by the steering sensor 1A and the vehicle speed sensor 1B to output a predetermined control signal C0 and an interface (hereinafter referred as I/F) circuit 202 which is provided between the main CPU 201 and the actuator 4 to input and output the control signal C0. In this embodiment, the control signal C0 is a left and right deflection angle signal for controlling the optical axis deflection angle of the swivel type lamps 3R, 3L with respect to the actuator 4.

A sub-control circuit 43 constituted within the actuator 4 provided in each of the left and right swivel type lamps 3R, 3L of an automobile includes a sub-CPU 431, an I/F circuit 432 for receiving a signal from and outputting a signal to the ECU 2, and a motor drive circuit 433 for rotating a brushless motor 42 serving as a driving source which is housed within the case 41 of the actuator 4 as a rotation driving means and rotates the rotation output shaft 411. The sub-CPU 431 controls the motor drive circuit 433 thereby to drive the motor 42 in accordance with the control signal C0 from the ECU 2 which is inputted through the I/F circuit 432, whereby the deflection angle of the projector lamp 30 can be controlled.

According to the aforesaid configuration, the ECU 2 receives the signal representing the rotation angle of the steering wheel SW, that is, the steering angle of an automobile detected by the steering sensor 1A disposed in an automobile CAR and the signal representing the vehicle speed of the automobile detected by the vehicle speed sensor 1B. The ECU 2 performs the calculation at the main CPU 201 based on the detection signals thus inputted to obtain the left and right deflection angle signals C0 of the projector lamps 30 at the swivel type lamps 3R, 3L and supplies the signals to the actuators 4 of the swivel type lamps 3R, 3L, respectively. In the actuator 4, the sub-CPU 431 performs the calculation based on the left and right deflection angle signal C0 thus inputted to calculate a signal corresponding to the left and right deflection angle signal C0 and supplies the signal thus calculated to the motor drive circuit 433 to rotate the motor 42. The rotation driving speed of the motor 42 is decelerated and transmitted to the rotation output shaft 411 to rotate the projector lamp 30 coupled to the rotation output shaft 411 in the horizontal direction, whereby the irradiation direction (optical axis direction) of the swivel type lamp 3R or 3L is deflected to the left and right directions. The deflection angle of the projector lamp 30 is detected by a rotation angle sensor (not shown) and the detected deflection angle is fed back to the sub-CPU 431, whereby the projector lamp can be controlled to have a deflection angle corresponding to the left and right deflection angle signal C0.

Figure 5:
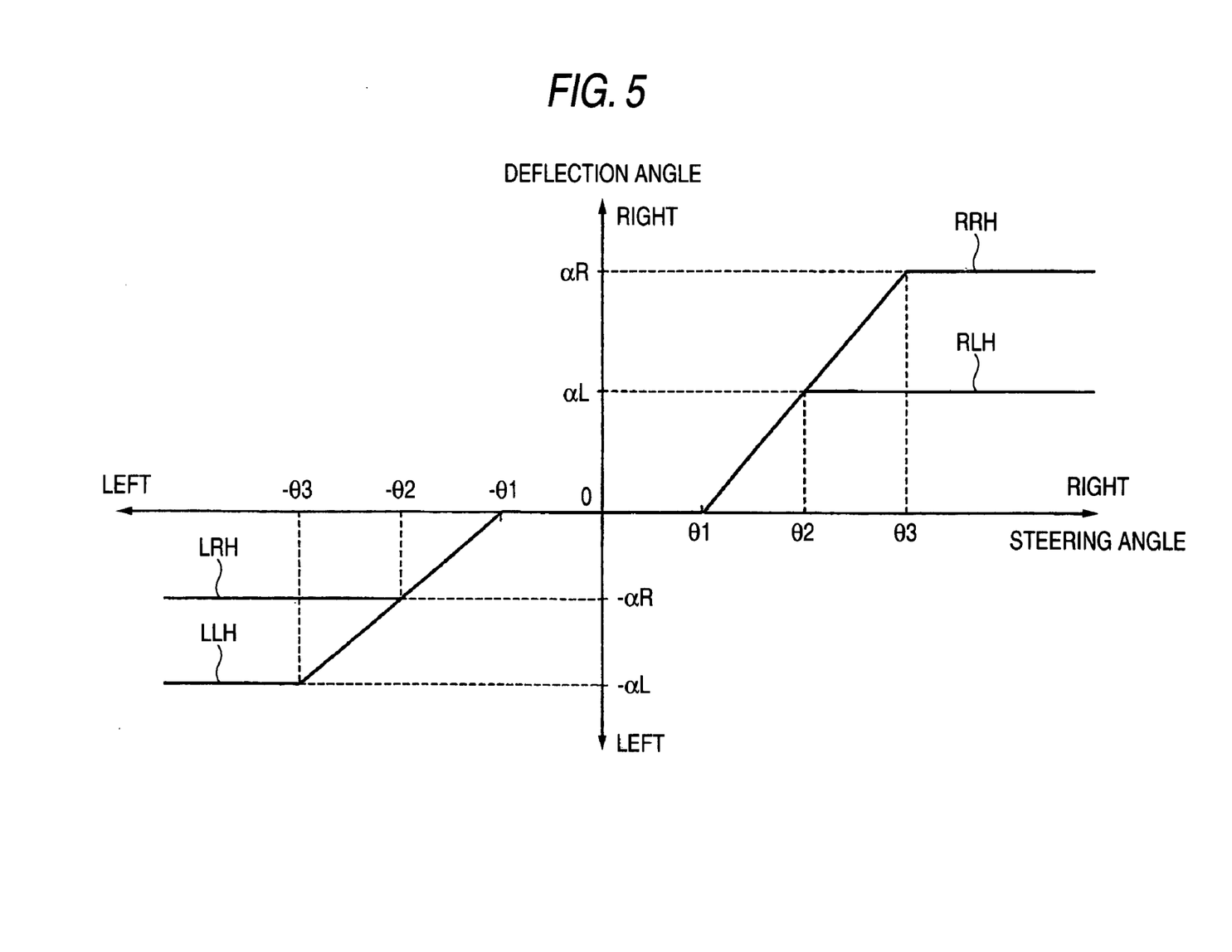
FIG. 5 is a diagram showing the characteristics of the deflection angles of each of the left and right swivel type lamps with respect to vehicle speeds at the time of steering to the left and right in a first embodiment.

FIG. 5 shows the deflection characteristics of the left and right swivel type lamps in such an AFS. This figure is based on the assumption that the traffic system is the left-hand traffic like Japan, wherein an abscissa represents a steering angle and an ordinate represents the deflection angle of the swivel type lamps to the left and right directions. Solid lines RRH and LRH represent the deflection angle characteristics of the right swivel type lamp to the right and left directions, respectively, and solid lines RLH and LLH represent the deflection angle characteristics of the left swivel type lamp to the right and left directions, respectively. According to these characteristics, at the time of traveling on a road curved to the right thereby to steer to the right, as shown by the characteristics of RRH and RLH, an area from 0 degrees to the predetermined steering angle $\theta1$ is a dead zone where none of the left and right lamps are deflected with respect to the steering operation. In contrast, when the steering angle exceeds $\theta1$, the deflection angle of each of the left and right swivel type lamps increases continuously and proportionally to the right in accordance with the increase of the steering angle. When the steering angles of the lamps reach predetermined values, that is, $\theta2$ for the left swivel type lamp and $\theta3$ for the right swivel type lamp which is slightly larger than $\theta2$, the deflection angles of the left and right swivel type lamps reach the maximum deflection angles $\alpha L$, $\alpha R$, respectively. Even when the steering angles of the lamps exceed these predetermined values, the deflection angles of the left and right swivel type lamps are kept to these deflection angles $\alpha L$, $\alpha R$, respectively.

On the other hand, at the time of steering to the left, as shown by the characteristics of LRH and LLH, an area from 0 degrees to the predetermined steering angle $-\theta1$ is a dead zone for each of the left and right lamps. When the steering angle exceeds $-\theta1$, the deflection angle of each of the left and right swivel type lamps increases continuously and proportionally to the left in accordance with the increase of the steering angle. When the steering angles of the lamps reach a predetermined value $-\theta2$ for the left swivel type lamp and a predetermined value $-\theta3$ for the right swivel type lamp which is slightly larger than $-\theta2$, the deflection angles of the left and right swivel type lamps reach the maximum deflection angles $-\alpha L$, $-\alpha R$, respectively. Even when the steering angles of the lamps exceed these predetermined values, the deflection angles of the left and right swivel type lamps are kept to these deflection angles $-\alpha L$, $-\alpha R$, respectively.

In this case, as to the steering operation to the right, a ratio of the maximum deflection angle $\alpha L$ of the left swivel type lamp with respect to the maximum deflection angle $\alpha R$ of the right swivel type lamp is set in a range of 2.5 to 1.5. In contrast, as to the steering operation to the left, a ratio of the maximum deflection angle $-\alpha L$ of the left swivel type lamp with respect to the maximum deflection angle $-\alpha R$ of the right swivel type lamp is also set in a range of 2.5 to 1.5.

Figure 6:
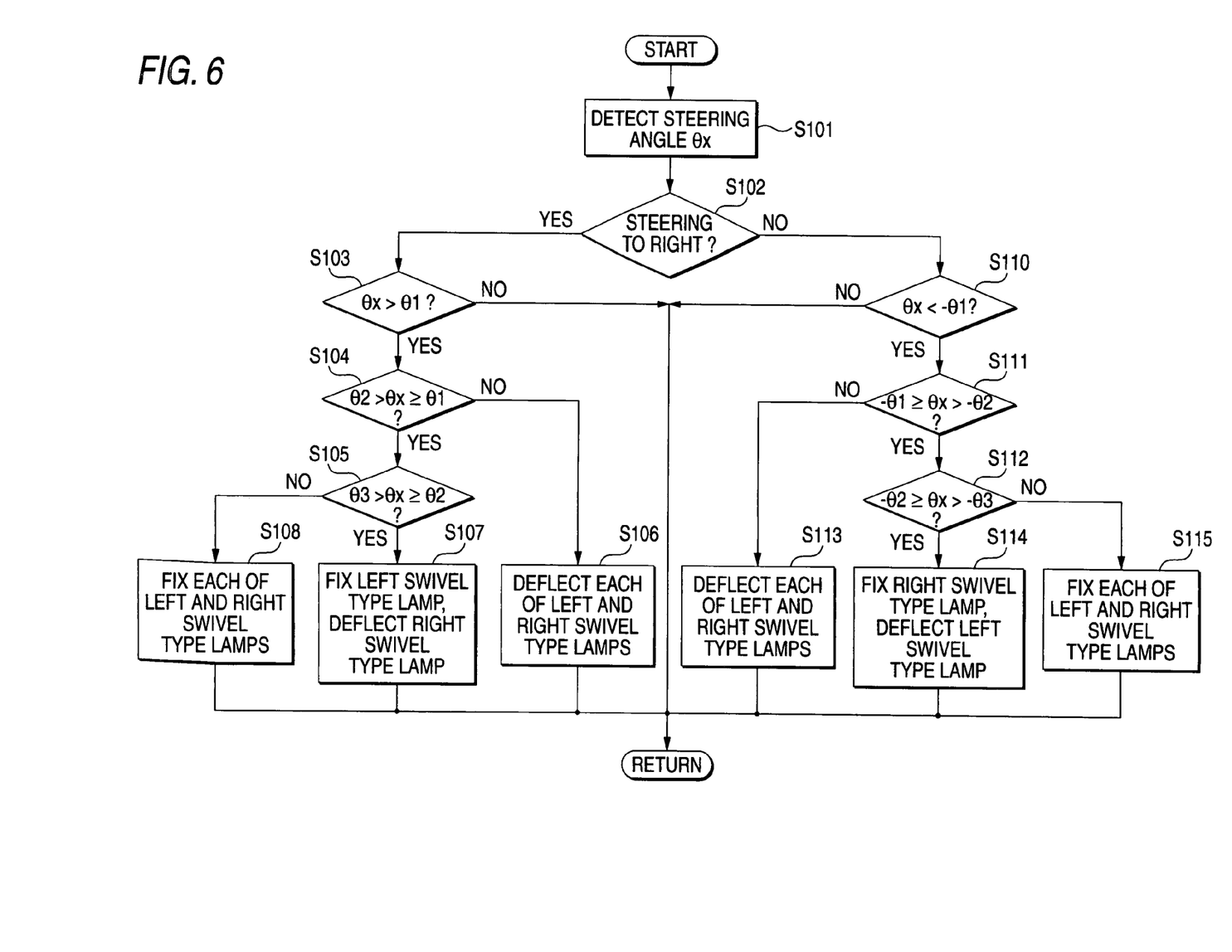
FIG. 6 is a flowchart for explaining the deflection operation in a first embodiment.

FIG. 6 is a flowchart for explaining the deflection operation of the left and right swivel type lamps. First, a steering angle $\theta x$ is detected based on the output of the steering sensor 1A (S101). Then, it is determined whether the steering wheel is steered to the right or left based on the detected steering angle $\theta x$ (S102). When it is determined that the steering wheel is steered to the right, the steering angle $\theta x$ is compared with the steering angle $\theta1$ to determine whether or not the detected steering-angle belongs to the dead zone (S103). When it is determined to belong to the dead zone, the deflection operation of the swivel type lamps is not performed and the process is returned. In contrast, when the detected steering angle does not belong to the dead zone, the steering angle $\theta x$ is compared with the steering angles $\theta1$ and $\theta2$ (S104). When it is determined that the detected steering angle is smaller than $\theta2$, the right and left swivel type lamps are deflected in accordance with the characteristics RRH and RLH of FIG. 5, respectively (S106). Further, the steering angle $\theta x$ is compared with the steering angles $\theta2$ and $\theta3$ (S105). When it is determined that the steering angle $\theta x$ is equal to or exceeds $\theta2$, the left swivel type lamp which is a swivel type lamp on the opposite side of the steering direction is fixed in its deflection angle to $\alpha L$, and only the right swivel type lamp which is on the steering direction side is kept to be subjected to the deflection operation when the steering angle is more than $\theta2$ (S107). When it is determined that the steering angle $\theta x$ equal to or exceeds $\theta3$, the deflection angle of the right swivel type lamp is fixed to $\alpha R$ (S108).

On the other hand, when it is determined that the steering wheel is steered to the left in step S102, the steering angle $\theta x$ is compared with the steering angle $-\theta1$ to determine whether or not the detected steering angle belongs to the dead zone (S110). When it is determined to belong to the dead zone, the deflection operation of the swivel type lamps is not performed and the process is returned. In contrast, when the detected steering angle does not belong to the dead zone, the steering angle θx is compared with the steering angles −θ1 and −θ2 (S111). When it is determined that the detected steering angle is larger than −θ1, the right and left swivel type lamps are deflected in accordance with the characteristics LRH and LLH of FIG. 5, respectively (S113). Further, the steering angle θx is compared with the steering angles −θ2 and −θ3 (S112). When it is determined that the steering angle θx is equal to or exceeds −θ2, the right swivel type lamp which is a swivel type lamp on the opposite side of the steering direction is fixed in its deflection angle to −αR, and only the left swivel type lamp which is on the steering direction side is kept to be subjected to the deflection operation when the steering angle is more than −θ2 (S114). When it is determined that the steering angle θx is equal to or exceeds −θ3, the deflection angle of the left swivel type lamp is fixed to −αL (S115).

Figure 7:
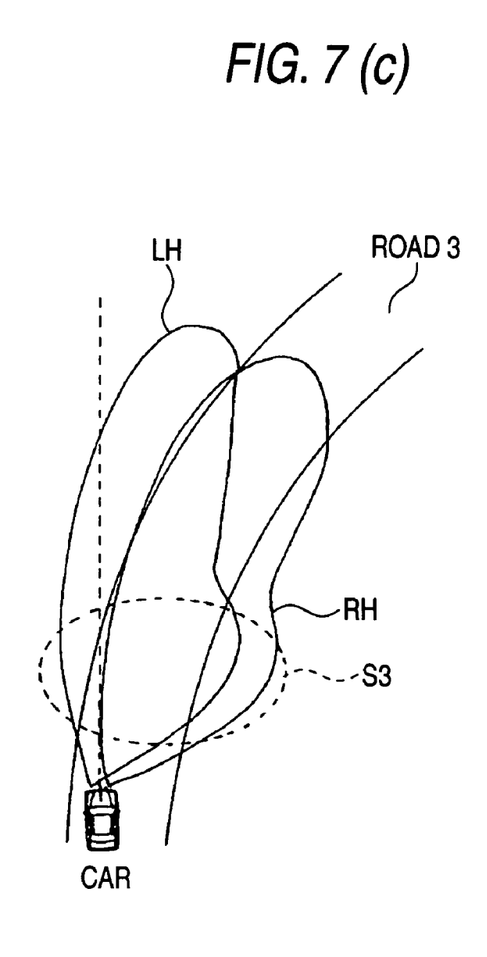
FIGS. 7a, 7b and 7c are diagrams showing the light distribution patterns at the time of steering to the right.

In this manner, since the deflection operation characteristics of each of the left and right swivel type lamps is set in accordance with the steering operation to the left or right, the irradiation direction can be controlled in the following manner. FIG. 7 shows the light distribution patterns with respect to the steering operation when an automobile CAR travels on a road ROAD curved to the right. Symbols RH, LH in the figure represent irradiation areas of the right and left swivel type lamps, respectively. As shown in FIG. 7(a), when the steering angle θx to the right direction is a small value between θ1 and θ2 like the case of the high speed traveling where an automobile travels on a curved road ROAD1 with a large radius of curvature, the irradiation areas LH, RH of the left and right swivel type lamps are continuously deflected to the right by the same small angle with respect to the straight traveling direction. Thus, the visibility of a distant area S1 ahead of an automobile can be improved by the left and right swivel type lamps.

As shown FIG. 7(b), when the steering angle θx to the right direction exceeds θ2 and exists between θ2 and θ3 like the case of the middle speed traveling where an automobile travels on a curved road ROAD2 with a slightly small radius of curvature, the deflection angle of the left swivel type lamp is fixed to αL. Thus, only the right swivel type lamp is continuously deflected to the right by a further small angle. Thus, although the right direction which is the traveling direction of an automobile is irradiated, the irradiation of the traveling direction is also secured by the left swivel type lamp. Accordingly, the visibility of a slightly distant area S2 which is a portion of the road ahead of the curve can be improved.

Further, as shown in FIG. 7(c), when the steering angle θx to the right direction exceeds θ3 like the case of the low speed traveling where an automobile travels on a curved road ROAD3 with a small radius of curvature, the deflection angle of the right swivel type lamp is fixed to αR, and the right swivel type lamp is not deflected any further to the right even when the steering angle increases. Thus, when the maximum deflection angle αR is set in advance to a suitable angle in correspondence to the actual traveling of an automobile, the right traveling direction is sufficiently irradiated by the right swivel type lamp but the right swivel type lamp is not deflected unnecessarily to the right direction. Further, an area in the traveling direction of an automobile can be irradiated sufficiently by the left swivel type lamp. Accordingly, the visibility of an area S3 which is just ahead of an automobile and a portion of the curved road can be improved and so the irradiation state suitable for stable driving is obtained. In particular, according to the embodiment, since the ratio of the maximum deflection angle αL with respect to the maximum deflection angle αR is set in a range of 2.5 to 1.5, the widest area from the straight traveling direction to the right direction can be irradiated with almost uniform illumination.

Figure 8:
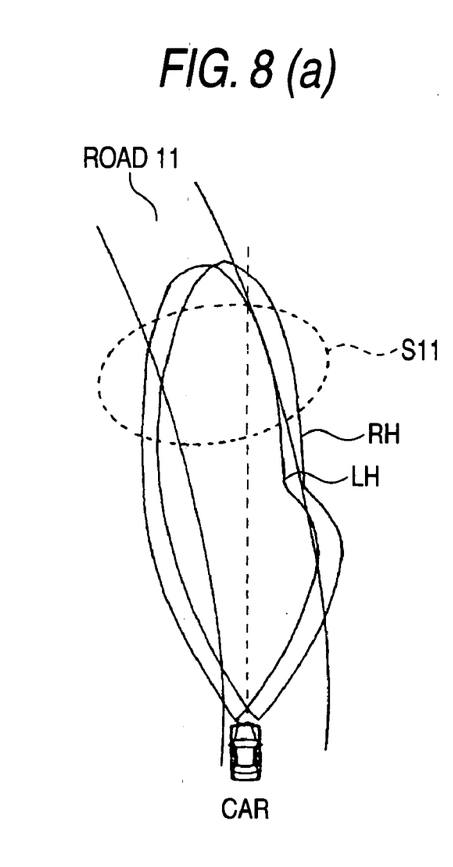
FIGS. 8a, 8b and 8c are diagrams showing the light distribution patterns at the time of steering to the left.

Such a deflection operation is performed in the steering operation at the time of traveling on a road ROAD curved to the left. FIG. 8 shows the light distribution patterns with respect to the steering operation at the time of traveling on a road curved to the left. As shown in FIG. 8(a), when the steering angle θx to the left direction is between −θ1 and −θ2 like the case of the high speed traveling where an automobile travels on a curved road ROAD11 with a large radius of curvature, the irradiation area S11 of the left and right swivel type lamps is continuously deflected to the left by the same small angle with respect to the straight traveling direction. As shown in FIG. 8(b), when the steering angle θx exceeds −θ2 and exists between −θ2 and −θ3 like the case of the middle speed traveling where an automobile travels on a curved road ROAD12 with a slightly small radius of curvature, the deflection angle of the right swivel type lamp is fixed to −αR. Thus, only the left swivel type lamp is continuously deflected to the left by a further small angle. Thus, although the left direction area S12 which is the traveling direction of an automobile is irradiated, the irradiation of the traveling direction is also secured by the right swivel type lamp. Further, as shown in FIG. 8(c), when the steering angle θx exceeds −θ3 like the case of the low speed traveling where an automobile travels on a curved road ROAD13 with a small radius of curvature, the deflection angle of the left swivel type lamp is fixed to −αL, and the left swivel type lamp is not deflected any further to the left even when the steering angle increases. Thus, when the maximum deflection angle −αL is set in advance to a suitable angle in correspondence to the actual traveling of an automobile, the left traveling direction is sufficiently irradiated by the left swivel type lamp but the left swivel type lamp is not deflected unnecessarily to the left direction. Further, an area in the traveling direction of an automobile can be irradiated sufficiently by the right swivel type lamp. Accordingly, an area S13 which is just ahead of an automobile can be irradiated suitably and so the irradiation state suitable for stable driving is obtained. In this case, since the ratio of the maximum deflection angle −αL with respect to the maximum deflection angle −αR is set in a range of 2.5 to 1.5, the widest area from the straight traveling direction to the left direction can be irradiated with almost uniform illumination.

Further, in this case, the deflection angles αL, αR to which the left and right swivel type lamps are fixed at the time of traveling on a road curved to the right are larger than angles −αL, −αR to which the left and right swivel type lamps are fixed at the time of traveling on a road curved to the left. This is because, in view of the fact that the light distribution characteristics of the left and right swivel type lamps are arranged to make the irradiation area on the left side larger and elongate it to a distant area than the irradiation area on the right side so as not to dazzle (or "blind") a driver of an automobile traveling on the opposite lane on the right side when the traffic system is the left-hand traffic, it is possible to sufficiently illuminate the left direction without enlarging the deflection angle to the left. Further, at the time of traveling on a road curved to the right, it is preferable to swivel the lamps in a range of about 10 to 20 degrees in order to increase the irradiation range as much as possible. In contrast, at the time of traveling on a road curved to the left which is large in the irradiation range originally, it is preferable to suppress the swivel angle to a small range of about 5 to 10 degrees in order to suppress the uncomfortable feeling due to the reflection from the guardrail etc.

At the time of traveling with a steering angle smaller than $\theta1$, $-\theta1$, since the dead zone is secured where the deflection operation is not performed even, when the steering wheel is steered to the left and right by a small angle like the traveling state close to the straight traveling state, it is possible to prevent the occurrence of a phenomenon that the irradiation ranges of the left and right swivel type lamps deflect frequently by a small amount and so a driver feels worrisome.

Figure 9:
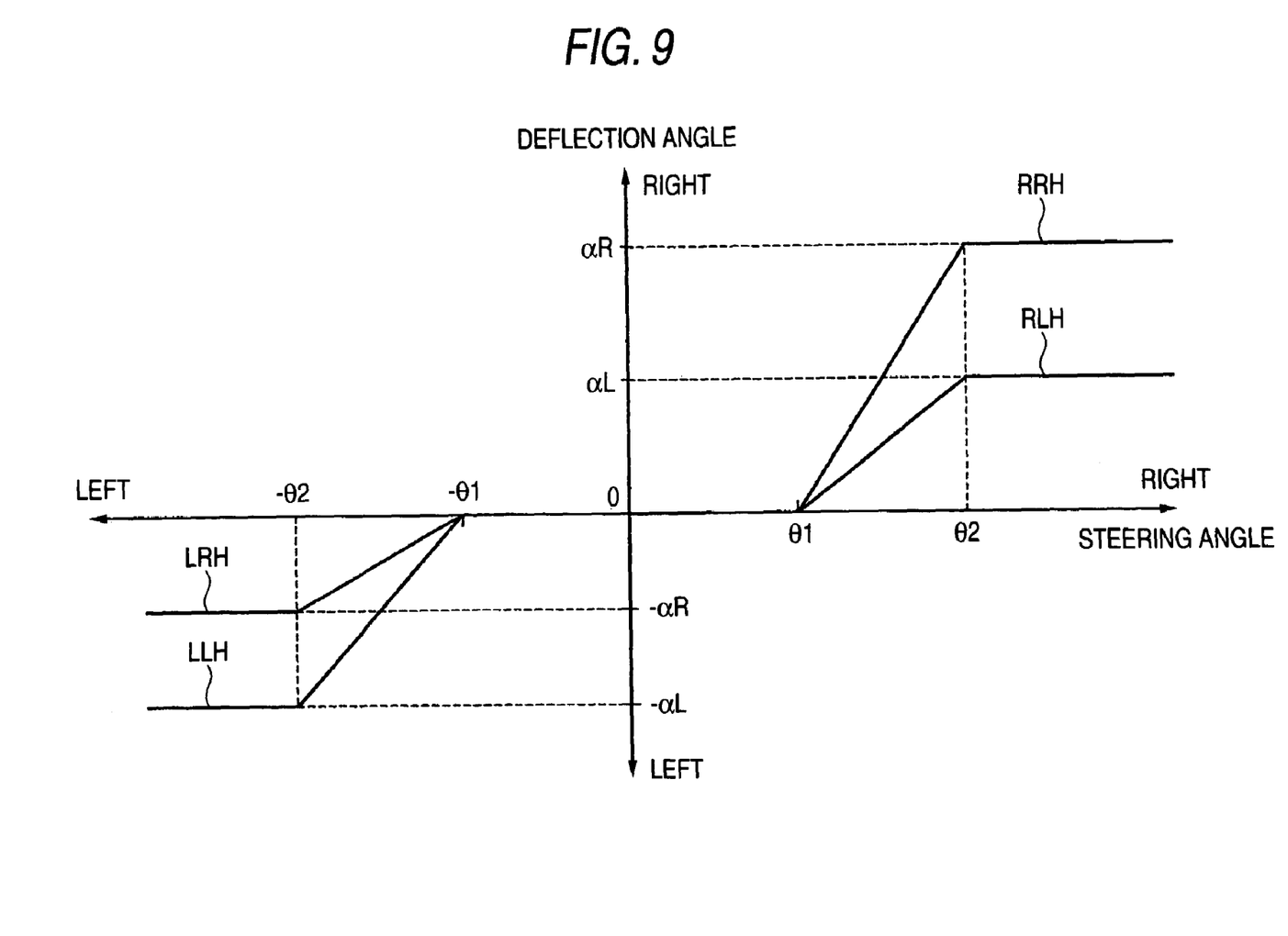
FIG. 9 is a diagram showing the characteristics of the deflection angles in a second embodiment.

Although the first embodiment performs the deflection operation that both the left and right swivel type lamps are simultaneously changed in their deflection angles with the same rate of change until the steering angles reach $-\theta2$, $\theta2$, respectively, in a second embodiment the rate of change may be differentiated between the left and right swivel type lamps. FIG. 9 illustrates the deflection characteristics in such a case. At the time of steering to the right, the rate of change or the inclination angle of the deflection characteristics of the left swivel type lamp is made smaller than the rate of change of the deflection characteristics of the right swivel type lamp. Further, the left and right swivel type lamps are fixed to particular deflection angles $\alpha L$, $\alpha R$ when the steering angle reaches $\theta2$, respectively. This matter is applied to the case of steering to the left. That is, at the time of steering to the left, the rate of change or the inclination angle of the deflection characteristics of the right swivel type lamp is made smaller than the rate of change of the deflection characteristics of the left swivel type lamp. Further, the left and right swivel type lamps are fixed to particular deflection angles $-\alpha L$, $-\alpha R$ when the steering angle reaches $-\theta2$, respectively. Also in this case, the particular deflection angles $-\alpha L$, $-\alpha R$ of the left and right swivel type lamps at the time of steering to the left are made smaller than the particular deflection angles $\alpha L$, $\alpha R$ of the left and right swivel type lamps at the time of steering to the right, respectively.

Figure 10:
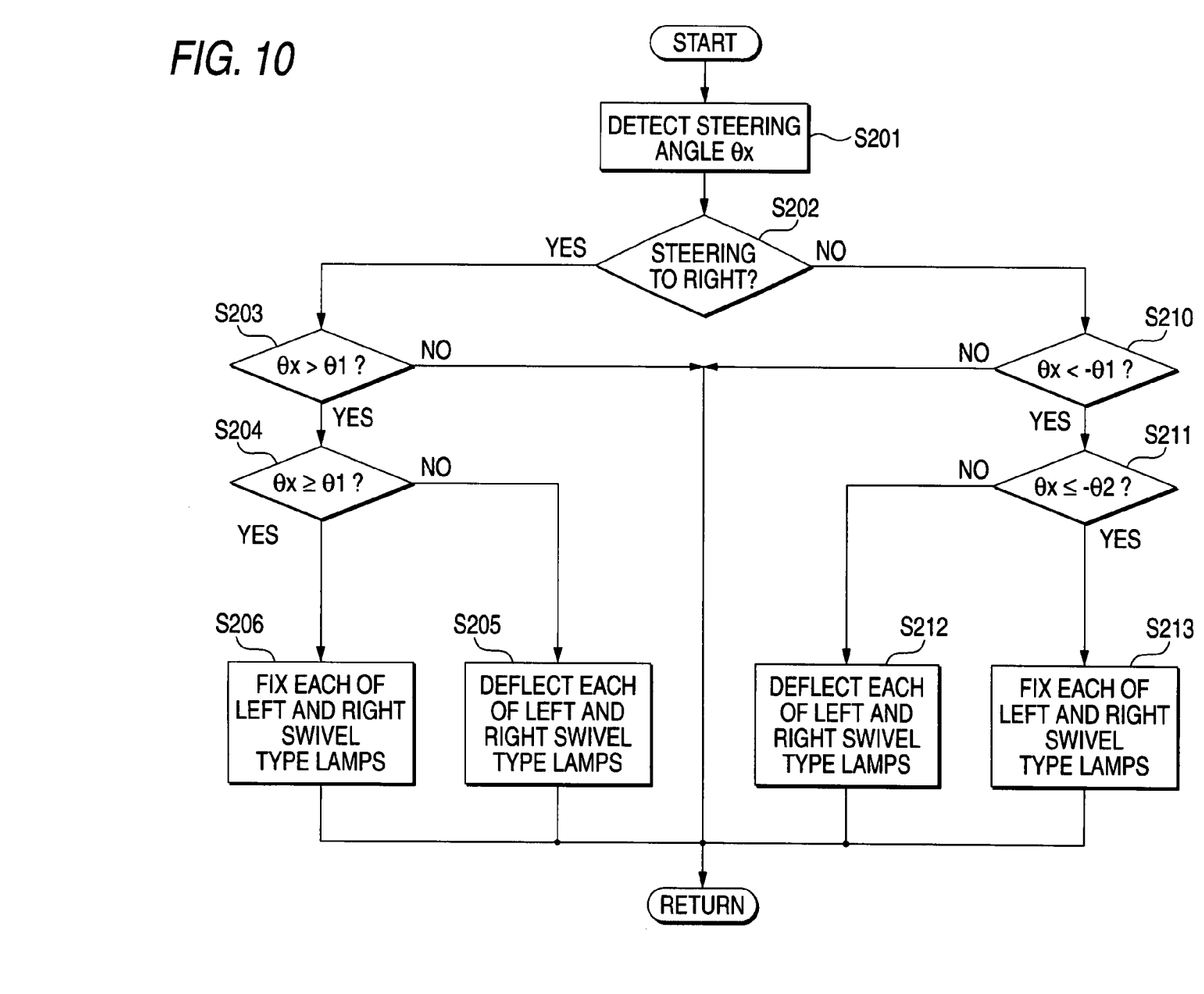
FIG. 10 is a flowchart for explaining the deflection operation in a second embodiment.

FIG. 10 is a flowchart for explaining the deflection operation in the second embodiment. First, a steering angle $\theta x$ is detected based on the output of the steering sensor 1A (S201). Then, it is determined whether the steering wheel is steered to the right or left based on the detected steering angle $\theta x$ (S202). When it is determined that the steering wheel is steered to the right, the steering angle $\theta x$ is compared with the steering angle $\theta1$ to determine whether or not the detected steering angle belongs to the dead zone (S203). When it is determined to belong to the dead zone, the deflection operation of the swivel type lamps is not performed and the process is returned. In contrast, when the detected steering angle does not belong to the dead zone, the steering angle $\theta x$ is compared with the steering angle $\theta2$ (S204). When it is determined that the detected steering angle is smaller than $\theta2$, the right and left swivel type lamps are continuously deflected in accordance with the characteristics RRH and RLH of FIG. 9, respectively (S205). When it is determined that the steering angle $\theta x$ is equal to or exceeds $\theta2$, the left and right swivel type lamps are fixed to $\alpha L$, $\alpha R$, respectively (S206).

On the other hand, when it is determined that the steering wheel is steered to the left in step 202, the steering angle $\theta x$ is compared with the steering angle $-\theta1$ to determine whether or not the detected steering angle belongs to the dead zone (S210). When it is determined to belong to the dead zone, the deflection operation of the swivel type lamps is not performed and the process is returned. In contrast, when the detected steering angle does not belong to the dead zone, the steering angle $\theta x$ is compared with the steering angle $-\theta2$ (S211). When it is determined that the detected steering angle is larger than $-\theta1$, the right and left swivel type lamps are deflected in accordance with the characteristics LRH and LLH of FIG. 9, respectively (S212). When it is determined that the steering angle $\theta x$ is equal to or smaller than $-\theta2$, the left and right swivel type lamps are fixed to $-\alpha L$, $-\alpha R$, respectively (S213).

Also in the second embodiment, when the maximum deflection angles $\alpha R$, $-\alpha L$ of the swivel lamps on the steering direction sides at the time of steering to the right and left are set in advance to suitable angles in correspondence to the actual traveling of an automobile, respectively, the traveling direction is sufficiently irradiated by the swivel type lamp on the steering direction side but the swivel type lamp is not deflected unnecessarily. Further, an area in the traveling direction of an automobile can also be irradiated sufficiently by the swivel type lamp on the side opposite to the steering direction, and so the irradiation state suitable for the stable driving is obtained. In particular, in this embodiment, the swivel type lamp on the steering direction side can be deflected quickly in accordance with the steering angle, while the swivel type lamp on side opposite to the steering direction side can be deflected slowly in accordance with the steering angle. Thus, even when the swivel type lamp on the steering direction side is deflected quickly in the traveling direction, a time period where the swivel type lamp on side opposite to the steering direction side irradiates the traveling direction can be held to be long, whereby a time period for irradiating a wide area can be made long.

Although the first and second embodiments are explained as to an example of the characteristics in which the deflection angle changes linearly with respect to the steering angle, the characteristics may be set so as to change the deflection angle in a curved manner with respect to the steering angle.

Although the first and second embodiments are explained as to an example where the invention is applied to a headlight in which the projector lamp constituting the swivel type lamp is deflected to the left and right directions to change the optical axis of irradiation, the invention may be applied to a headlight in which only a reflector is deflected or an auxiliary reflector provided independently from a main reflector is deflected to substantially change the irradiation area.

Further, the first and second embodiments are explained as to an example where the invention is applied to an automobile traveling according to the left-hand traffic system. In contrast, in the case of an automobile traveling according to the right-hand traffic system, it goes without saying that the deflection characteristics of the left and right swivel type lamps in this case are set to be those of the right and left swivel type lamps of the aforesaid embodiment, respectively.

What is claimed is:

1. A vehicle lighting apparatus comprising lamps for installation at front left and right portions of an automobile, wherein an irradiation direction of the lamps can be deflected to left and right directions in association with a steering operation of a steering apparatus, wherein deflection angles of the left and right lamps are continuously increased in correspondence to increase of a steering angle until the steering angle reaches a predetermined value, the left and right lamps are held at particular deflection angles respectively when the steering angle is equal to or more than a predetermined steering angle, and the value of the particular deflection angle of the lamp on a steering direction side is made larger than that of the lamp on a side opposite to the steering direction side.

2. A vehicle lighting apparatus according to claim 1, wherein a ratio of the particular deflection angle of the lamp on the steering direction side with respect to the particular deflection angle of the lamp on the side opposite to the steering direction side is in a range of 1.5 to 2.5.

3. A vehicle lighting apparatus according to claim 1, wherein the deflection angles of the left and right lamps are changed with a same rate of change with respect to the steering angle until the steering angle reaches the predetermined steering angles, and the predetermined steering angle of the lamp on the steering direction side differs from the predetermined steering angle of the lamp on the side opposite to the steering direction side.

4. A vehicle lighting apparatus according to claim 1, wherein a rate of change of the deflection angle of the lamp on the steering direction side with respect to the steering angle is made larger than a rate of change of the deflection angle of the lamp on the side opposite to the steering direction side with respect to the steering angle until the steering angle reaches the predetermined steering angle.

5. A vehicle lighting apparatus according to claim 4, wherein the predetermined steering angle of the lamp on the steering direction side is the same as the predetermined steering angle of the lamp on the side opposite to the steering direction side.

6. A vehicle lighting apparatus according to claim 1, wherein the lamp on the steering direction side is a lamp on an opposite lane side and the lamp on the side opposite to the steering direction side is a lamp on a shoulder side of a road.

* * * * *